Figure 1:
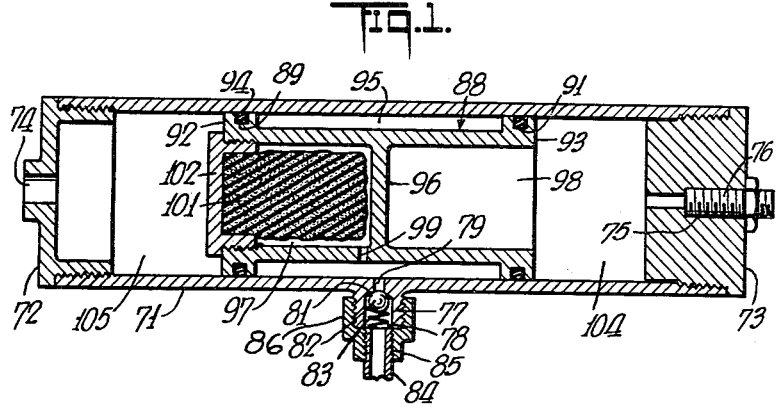

Jan. 22, 1963  J. MERCIER  3,074,437
PISTON ACCUMULATOR
Original Filed Feb. 10, 1953  2 Sheets-Sheet 1

INVENTOR
Jean Mercier
BY
Dean Fairbank & Hirsch
ATTORNEYS

Jan. 22, 1963 J. MERCIER 3,074,437
PISTON ACCUMULATOR
Original Filed Feb. 10, 1953 2 Sheets-Sheet 2

INVENTOR
Jean Mercier
BY
Dean Fairbank & Hirsch
ATTORNEYS

United States Patent Office 3,074,437
Patented Jan. 22, 1963

3,074,437
PISTON ACCUMULATOR
Jean Mercier, 1185 Park Ave., New York, N.Y.
Original application Feb. 10, 1953, Ser. No. 336,054, now Patent No. 2,817,361, dated Dec. 24, 1957. Divided and this application Oct. 9, 1957, Ser. No. 689,223
7 Claims. (Cl. 138—31)

This invention relates to piston type pressure vessels such as pressure accumulators or the like and more particularly to the piston seal between the gas and liquid chambers of the pressure vessel.

As conductive to an understanding of the invention, it is noted that unless a dependable seal is provided for the piston between the gas and liquid chambers of a piston type pressure vessel, the resultant leakage of liquid into the gas chamber necessitates frequent servicing of the device for draining of such liquid and the leakage of gas into the liquid chamber and its subsequent entry into the hydraulic system might be detrimental to the proper functioning of the unit to be operated by the device such as for example the hydraulic brakes of a truck which would not operate dependably if a gas bubble entered the unit.

Where a single O ring type seal is used for the piston, the effectiveness of such seal is poor when the pressure on both sides of the piston is identical, as is usually the case in piston type pressure vessels, for such seal only operates effectively when there is a greater pressure on one side than the other which will force the O ring toward the low pressure side into the space between the piston and the adjacent wall of the device to create an effective seal.

Where two O rings are used on a piston on each side of an annular groove therein, and the annular groove is vented to atmosphere in an attempt to secure a differential between the pressure on opposite sides of each of the rings, as pressure vessels are generally used under relatively high pressures, the differential is often so great as to cause excessive distortion of the O rings with resultant extrusion between the piston and the wall of the device, so that upon sliding movement of the piston in use of the device, the O rings will rapidly break down with resultant failure of the seal and leakage between the liquid and gas chambers.

Accordingly, it is among the objects of the invention to provide a piston type pressure vessel which will function without leakage between the gas and liquid chambers and without likelihood of injury to the resilient sealing means between the piston and the wall of the device even after long periods of use, which device is relatively simple in construction having but few parts, none of which are delicate or likely to become deranged and which may readily be assembled and disassembled for cleaning and maintenance.

Another object is to provide a pressure device of the above type which will permit a predetermined differential between the pressure on opposed sides of the resilient sealing means, which pressure during normal operation of the device is considerably less than the difference between atmospheric pressure and the pressure in the liquid and gas chambers.

Another object is to provide a pressure device of the above type which upon attainment of a predetermined pressure on the inner sides of the resilient sealing means will permit discharge of fluid into the liquid chamber of the device to retain such pressure at no greater than the predetermined amount.

According to the broad aspect of the invention, a pair of resilient seals encompasses the periphery of a piston type pressure vessel and are positioned on each side respectively of an annular groove associated with the periphery of said piston. Valve means are provided, operatively connected to such annular groove and adapted to discharge fluid therefrom when a predetermined pressure has been attained therein.

This application is a division of co-pending application Serial No. 336,054, filed February 10, 1953, now Patent No. 2,817,361, dated December 24, 1957.

In the accompanying drawings in which are shown one or more of various possible embodiments of the several features of the invention, FIGS. 1 to 4 are longitudinal sectional views of different illustrative embodiments of the invention.

Referring now to the drawings, the embodiment shown in FIG. 1 desirably comprises a substantially cylindrical sleeve 71 having plugs 72 and 73 screwed in each end thereof, said plugs each having a port 74 and 75 therethrough respectively, the port 75 desirably having a gas valve 76 threaded therein. The sleeve 71 desirably has a cylindrical boss 77 extending radially therefrom midway between its ends. The boss 77 desirably has a bore 78 therethrough of reduced diameter at its inner end as at 79 defining a passageway leading into the sleeve and forming a shoulder 81. The passageway 79 is desirably controlled by a valve which in the illustrative embodiment herein may comprise a ball 82 normally urged against the shoulder 81 which forms a valve seat, to seal said passageway 79, by means of a coil spring 83 compressed between the ball and the end of an outlet pipe 84 screwed in the bore 85 of a hollow nut 86 threaded on the boss 77. Desirably, as shown, the passageway 79 is positioned on the undersurface of the sleeve 71 for the purpose hereinafter to be described.

Slidably mounted in the sleeve 71, which forms the shell of the pressure vessel, is a piston 88 desirably having a pair of spaced annular grooves 89 and 91 in the outer periphery thereof near the ends 92 and 93 of the piston respectively and an elongated annular groove 95 in its outer periphery extending between said annular grooves 89 and 91, each of said grooves 89 and 91 desirably having a resilient seal therein preferably an O ring 94. The piston 88 which desirably is hollow has a transverse central wall 96, defining chambers 97 and 98 on each side, the chamber 97 being in communication with annular groove 95 by means of a transverse bore 99. A secondary pressure vessel is desirably provided defined by the chamber 97. In the illustrative embodiment such secondary pressure vessel may comprise a cylindrical block 101 of foam rubber, having one end affixed in a plug 102 threaded into the open end of chamber 97 with its other end extending to nearly the wall 96.

Desirably, the length of the piston 88 is such that in either of its extreme positions, i.e., with its end 92 against plug 72 or its end 93 against plug 73, the passageway 79 in shell 71 will still lead into annular groove 95.

In the operation of the device shown in FIG. 1, gas under pressure is first forced through valve 76 to charge chamber 104. As a result, the piston will move to the left. Fluid under pressure greater than that of the gas in chamber 104 is forced through port 74 into chamber 105 to move the piston 88 to the right further to compress the gas in chamber 104. The device is then ready for use.

In the present condition of the device, as the gas in annular groove 95 will be substantially only under atmospheric pressure and the gas and fluid in chambers 104 and 105 respectively will be under a considerably greater pressure, a differential will be provided between the pressure on opposed sides of the O rings 94 which will force the O rings toward the low pressure side into the space between the piston and adjacent wall of the device to provide an effective seal. However, the pressure differential is so great that unless relieved rapidly, the movement of the piston in the use of the pressure device would cause extrusion of the O rings and in addition continuous sliding movement of the piston under such conditions would cause rapid deterioration of the O rings and resultant breakdown of the seals.

This pressure differential is relieved by a few operations of the pressure device, for each time fluid is permitted to escape from port 74 during normal use, the piston 88 will move slightly to the left providing a pumping action which will force a small quantity of fluid from chamber 105 past O ring 94 into annular groove 95, through port 99 into chamber 97 to compress the foam rubber block 101, thereby increasing the pressure on the gas in annular groove 95 and in chamber 97 which originally was atmospheric. Such pumping action will quickly increase the pressure in annular groove 95 and in chamber 97 to reduce the differential between the pressure on opposed sides of the O rings. When such pressure in chamber 95 has increased to the desired value to be maintained, based on the tension of spring 83, the ball 82 will move off its seat to relieve any further pressure increases.

By reason of the positioning of the bore 78 in the bottom of the sleeve 71, when the ball 82 is moved off its seat, substantially only fluid will be forced from pipe 84 as the gas pocket will tend to remain in the top or upper portion of annular groove 95.

By reason of the pumping action heretofore described, it is apparent that the pressure of the air in annular groove 95 will quickly rise to reduce the differential between the pressure on the opposed sides of the O rings. The construction herein described ensures that a differential pressure will be maintained at all times for effective sealing action as the pressure in the annular groove 95 is relieved by means of the movement of the ball valve 82 to open bore 79 when such pressure has risen to a predetermined amount which is below the minimum pressure under which the fluid in chamber 105 will be maintained during normal use of the device.

Thus, for example, assuming that the pressure of the gas originally charged in chamber 104 is 1,000 p.s.i. and the fluid forced into chamber 105 compresses such air to say 3,000 p.s.i., the spring 83 may be adjusted to exert a force against ball 81 so that it will relieve the pressure in annular groove 95 when the pressure therein rises above 1,000 p.s.i. Thus, since the pressure on the fluid in chamber 105 will not fall to 1,000 p.s.i. until such chamber is substantially empty, a differential pressure no greater than 2,000 p.s.i. will always be provided for dependable sealing action of the O rings, yet such pressure is below that which would cause extrusion of the O rings with the difficulties above pointed out. By reason of the foam rubber block 101, added capacity is provided to insure that the ball valve 81 will unseat at the predetermined pressure.

As a result, a desired differential pressure may be provided which, though sufficient to prevent leakage past the O rings, will not be so great as to cause deformation thereof upon sliding movement of the piston.

Figure 2:
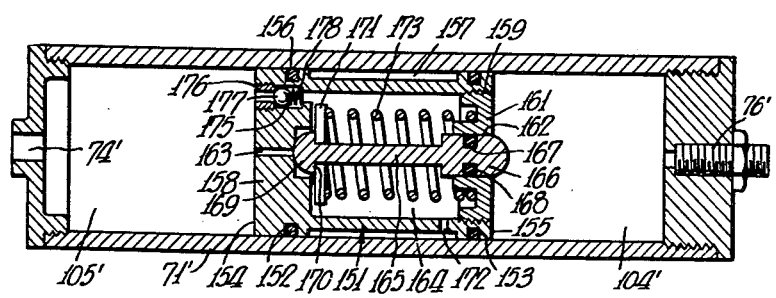
Figure 3:
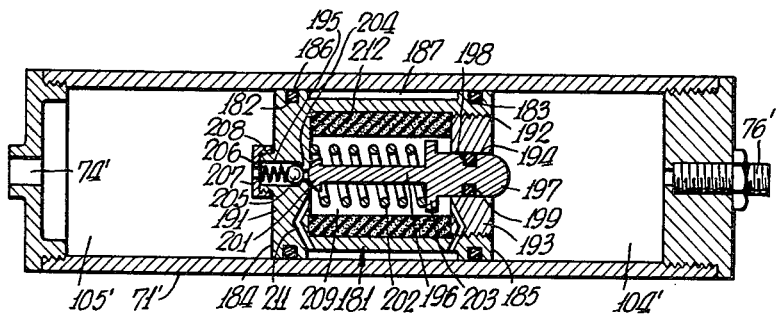
Figure 4:
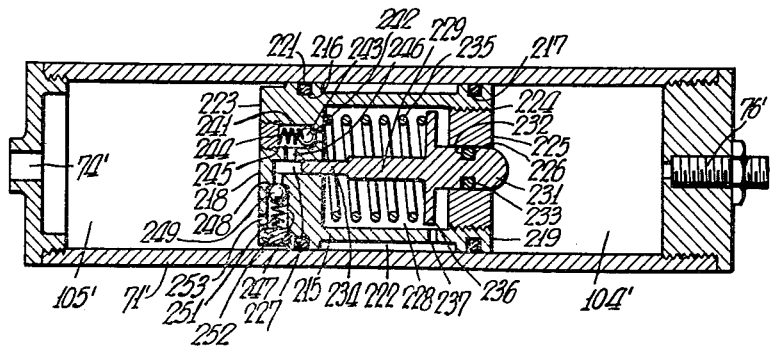

The embodiments shown in FIGS. 2 to 4 desirably utilize a shell construction substantially identical to that shown in FIG. 1 and corresponding parts have the same reference numerals primed.

In the embodiment shown in FIG. 2, a substantially cylindrical piston 151 is slidably mounted in shell 71'. The piston desirably has a pair of spaced annular grooves 152 and 153 near each of its ends 154 and 155 respectively, and an elongated annular groove 157 extending between the annular grooves 152, 153, a resilient sealing member such as an O ring 156 desirably being positioned in each of such annular grooves 152, 153. The piston 151 is desirably cup-shaped, having a wall 158 at its end 154 and having an open mouth 159 at its end 155, the mouth 159 being desirably sealed by a threaded plug 161 having an axial bore 162 therethrough desirably longitudinally aligned with an axial bore 163 through end wall 158, the diameter of bore 163 being small as compared to the diameter of bore 162 to minimize reaction due to variations in the liquid pressure.

Positioned in the bore 164 of piston 151 is a rod 165 desirably of enlarged diameter at one end as at 166, said enlarged diameter end 166 being slidable in bore 162 with substantially no transverse play and desirably having an annular groove 167 in which an O ring 168 is positioned to provide a seal between the wall of bore 162 and the outer surface of enlarged portion 166. The other end of rod 165 is also desirably of enlarged diameter as at 169 defining a shoulder 170 against which is positioned a split type washer 171. The enlarged portion 169 of the rod 165 is normally urged to seal bore 163 by means of a coil spring 173 compressed between washer 171 and the inner surface of plug 161.

Desirably, the bore 164 of the piston 151 is in communication with annular groove 157 by means of a radial bore 172. The end wall 158 of the piston desirably has a bore 175 extending therethrough and radially displaced from bore 163. Bore 175 desirably has a hollow plug 176 screwed in the outer end thereof which defines a seat for a ball valve 177 normally retained against said seat by a coil spring 178 in bore 175.

In the operation of the embodiment shown in FIG. 2, gas under pressure is forced through valve 76', into chamber 104'. As a result, the piston 151 will be moved to the left. By reason of the pressure exerted against the end 166 of rod 165, together with the force exerted by spring 173, the end 169 of rod 165 will be retained in sealing position with respect to bore 163. Assuming that the device is to be used at a maximum pressure of 3,000 p.s.i., fluid is forced through inlet port 74', into chamber 105' under greater pressure than that of the gas in chamber 104', which is initially say at 1,000 p.s.i. As a result, the piston will be moved to the right further compressing the gas in chamber 104' say to a pressure of 3,000 p.s.i. As the pressure in fluid chamber 105' is substantially equal to that in the chamber 104', the bore 163 will remain sealed by reason of the added force of spring 173 which retains end 169 in sealing relationship to such bore 163.

At this time, the pressure in annular groove 157 and in bore 164 of the piston 151 is substantially equal to atmospheric pressure. As the spring 178 desirably exerts a force of slightly greater than 2,000 pounds against ball 177 to retain the latter seated, as soon as the pressure in chamber 105' rises above 2,000 p.s.i. ball 172 will be unseated and fluid will flow into bore 164 and groove 157 until the pressure therein has reached 1,000 p.s.i. at which time spring 178 will again seat ball 177. As a result, upon initial charging of the device, the differential pressure on the O rings will only be 2,000 p.s.i. which will not cause injury thereto.

After a few operations of the pressure device, which will discharge fluid from port 74', the successive movements of the piston to the left will provide a pumping action which will force fluid into annular groove 157 and bore 164 to increase the pressure therein, thereby decreasing the differential between the pressure on opposed sides of the O rings 156. Such movements of the piston will also cause the gas pressure and consequently the fluid pressure to be reduced to below the maximum original pressure of 3,000 p.s.i.

As long as the pressure in the piston bore 164 and annular groove 157 is less than the gas pressure in chamber 104', the bore 163 will remain sealed. As the pumping action continues with use of the pressure device, the pressure in the piston will quickly rise to a value above the gas pressure. Thus, a differential between the pressure on opposed sides of the O ring will still be maintained with the pressure being greater on the inner side of said O rings. When the pressure in the piston rises to an amount such that the force exerted against rod 165 to move it to the right is greater than the spring force plus the force exerted against rod 165 by the gas pressure in chamber 104' against end 166, the rod will move to the right to open bore 163 thereby relieving the pressure in the piston. The bore 163 will again close when the piston pressure has been sufficiently relieved and the tension of spring 173 is such that the differential pressure on the O rings will not exceed a predetermined amount.

Where the pressure device, shown in FIG. 2, is used under high pressures, such as when the fluid is initially forced into chamber 105' under a pressure of say 9,000 p.s.i., the bore 163 will remain closed as the pressure in gas chamber 104' plus the pressure of spring 173 will retain enlarged member 168 in sealing position. Where spring 178 exerts a force of say 3,000 pounds, the fluid in chamber 105' which is under such pressure of 9,000 p.s.i., will move ball 177 off its seat and fluid will flow into the piston bore 164 to compress the gas therein as well as the gas in annular groove 157 to a pressure of 6,000 pounds at which time ball 177 will seat and thus the maximum differential between the pressure on opposed sides of the O rings 156 will not exceed 3,000 p.s.i.

The pressure device when used under high pressure will function in the same manner as previously described when used with low pressure, that is, the pressure in the piston bore 164 and groove 157 will quickly increase to above the pressure in the gas and fluid chambers 104', 105' and be retained at a maximum predetermined pressure by the relief through bore 163.

In the embodiment shown in FIG. 3, a substantially cylindrical piston 181 is slidably mounted in shell 71'. This piston desirably has a pair of spaced annular grooves 182 and 183 near its ends 184 and 185 respectively, and an elongated annular groove 187 extending between the annular grooves 182 and 183, a resilient sealing member such as an O ring 186 desirably being positioned in each of such annular grooves 182, 183. The piston 181 is desirably cup-shaped, having a wall 191 at its end 184 and having an open mouth 192 at its end 185, the mouth 192 being desirably sealed by a threaded plug 193 having an axial bore 194 therethrough desirably longitudinally aligned with axial bore 195 through end wall 191.

Positioned in the bore 209 of piston 181 is a rod 196 desirably of enlarged diameter at one end as at 197, said enlarged diameter end 197 being slidable in bore 194 with substantially no transverse play and desirably having an annular groove 198 in which an O ring 199 is positioned to provide a seal between the wall of bore 194 and the outer surface of enlarged portion 197. The other end of rod 196 is also desirably of enlarged diameter as at 201. The enlarger portion 201 of rod 196 is normally urged away from bore 195 by means of a coil spring 202 encompassing said rod and compressed between wall 191 and an annular shoulder 203 rigid with said rod. The bore 195 desirably is of reduced diameter at its inner end defining a seat 204 against which is positioned a ball 205, the latter being retained on its seat by means of a coil spring 206 in said bore compressed between the ball and a ported cap 207 threaded on an annular boss 208 about said bore 195.

Desirably the bore 209 of the piston is in communication with annular groove 187 by means of a passageway 211, and a sleeve 212 of resilient material such as foam rubber may be positioned in bore 209 encompassing the coil spring 202 and being normally spaced therefrom as shown.

In the operation of the embodiment shown in FIG. 3, as in the previous embodiments heretofore described, gas under pressure is forced through gas valve 76' into chamber 104'. As a result, the piston 181 will be moved to the left. Assuming that the pressure device is to be used under a maximum pressure of 3,000 p.s.i., fluid is forced through inlet port 74' into chamber 105' under greater pressure than that of the gas in chamber 104' which is initially at say 1,000 p.s.i. By reason of the ball valve 205, no fluid will be forced into the piston bore 209 when chamber 105' is initially charged. As a result, the piston will be moved to the right further compressing the gas in chamber 104'. As at this time the gas in the piston bore 209 and groove 187 is substantially at atmospheric pressure, much less than the pressure in chamber 104', the force exerted by the gas against the enlarged end 197 of rod 196 will overcome the atmospheric pressure plus the force exerted by spring 202 to move enlarged portion 201 to seal bore 195.

After a few operations of the pressure device which will discharge fluid from port 74', the successive movements of the piston to the left will provide a pumping action which will force fluid into annular groove 187 and through passageway 211 into bore 209 quickly to increase the pressure therein and also increase the differential between the pressure on opposed sides of the O rings 186. Such movements of the piston will also cause the gas pressure and consequently the fluid pressure in chambers 104' and 105' respectively to be reduced below the maximum original pressure of 3,000 p.s.i.

As long as the pressure in the piston bore 209 and annular groove 187 plus the force exerted by spring 202 is less than the force provided by the pressure in gas chamber 104', against the enlarged end 197 of rod 196, bore 195 will remain sealed. As the pumping action continues with use of the device, the pressure in the piston bore will rise sufficiently so that combined with spring 202 it will overcome the pressure of the gas in chamber 104' and the rod 196 will be moved to the right to move enlarged portion 201 away from bore 195. However, as long as the pressure of the fluid in the chamber 105' is greater than that in the piston bore 209 and groove 185, ball 205 will remain seated so that no fluid can flow out of the piston.

As the pumping action continues, the pressure in the piston bore and groove 187 will quickly rise to a value above that of the fluid pressure in chamber 105'. Thus, a differential between the pressure on opposed sides of the O ring will still be maintained with the pressure being greater on the inner side of said O rings. When the pressure in the piston rises to an amount such as to exceed the pressure in the fluid chamber by greater than the force exerted by spring 206, the ball 205 will be moved off its seat for relief of pressure from the piston bore 209 and groove 187 and such ball will again seat. The spring 206 may exert such force, for example, that it requires a pressure of 1,000 p.s.i. to move ball 205 off its seat. Thus, the differential between the pressure on opposed sides of the O rings will never fall below this amount once it is attained during normal operation.

In the embodiment shown in FIG. 4, a substantially cylindrical piston 215 is slidably mounted in shell 71'. The piston desirably has a pair of spaced annular grooves 216 and 217 near each of its ends 218 and 219 respectively, and an elongated annular groove 222 extending between the annular grooves 216 and 217, a resilient sealing member such as an O ring 221 desirably being positioned in each of said annular grooves 216, 217.

The piston 215 is desirably cup-shaped, having a wall 223 at its end 218 and having an open mounth 224 at its end 219, the mouth 224 being desirably sealed by a threaded plug 225 having an axial bore 226 therethrough desirably longitudinally aligned with an axial elongated cavity 227 extending from the inner surface of wall 223. Positioned in the bore 228 of piston 215 is a rod 229 desirably of enlarged diameter at one end as at 231, said enlarged diameter end 231 being slidable in bore 226 with substantially no transverse play and desirably having an annular groove 232 in which an O ring 233 is positioned to provide a seal between the wall of bore 226 and the outer surface of enlarged portion 231. The other end of rod 229 is of reduced diameter as at 234 and fits snugly in bore 227, yet free to slide therealong, said reduced portion 234 acting as a pump piston in the manner hereinafter to be described.

The reduced portion 234 is normally urged to retracted position in bore 227 by means of a coil spring 235 encompassing rod 229 and compressed between the inner surface of wall 223 and a flange 236 rigid with said rod. Desirably the bore 228 of the piston is in communication with annular groove 222 by means of a radial bore 237.

The end wall 223 of the piston desirably has a bore 241 extending therethrough radially displaced from bore 227 and of reduced diameter at its inner end defining a ball seat 242. A ball 243 in said bore 241 is normally retained against said seat by a coil spring 244 compressed between the ball and a plug 245 threaded into bore 241. Bore 241 is in communication with bore 227 through a radial bore 246 and bore 227 is in communication with a transverse bore 247 in end wall 223, said transverse bore being of reduced diameter at its inner end defining a ball seat 248. A ball 249 in bore 247 is normally retained against its seat by a coil spring 251 compressed between the ball and a plug 252 threaded in the end of the bore 247, a passageway 253 being provided between said bore 247 and the fluid chamber 105'.

In the operation of the embodiment shown in FIG. 4 as in the previous embodiments heretofore described, gas under pressure is forced through valve 76' into chamber 104'. As a result, piston 215 will move to the left. Assuming that the accumulator is to be used under a pressure of 3,000 p.s.i., fluid is forced through inlet port 74' into chamber 105' under greater pressure than that of the gas in chamber 104' which is initially, say at 1,000 p.s.i. As a result, the piston 215 will be moved to the right further compressing the gas in chamber 104'. By reason of the ball valve 249, which seals bore 247, no fluid will flow therethrough when the fluid chamber is originally charged.

As the pressure in bore 228 and annular groove 222 is originally atmospheric, by reason of the pressure exerted against the enlarged end 231 of rod 229, such rod will be moved to the left against the tension of coil spring 235.

After a few operations of the device which will discharge fluid from port 74', the successive movements of the piston to the left will provide a pumping action which will force fluid into annular groove 222 and bore 228 to increase the pressure therein, thereby decreasing the differential between the pressure on opposed sides of the O ring. Such movements of the piston will also cause the gas pressure and consequently the fluid pressure in chambers 104' and 105' to be reduced to below the maximum original pressure of 3,000 p.s.i.

When the pressure in the piston bore 228 and in annular groove 222 increases to an amount such that the piston pressure plus the force exerted by spring 235 will overcome the pressure in the gas chamber 104' against end 231 of the rod 229, such rod will move to the right. As a result of the outward movement of end 234 of rod 229 from bore 227, a suction action will be created in bore 227 which will move ball 243 off its seat to draw fluid from the piston bore 228 into said bore 227. As the result of such flow of fluid, the pressure in the piston bore 228 and annular groove 222 will drop so that the pressure in chamber 104' will again move the rod 229 to the left. This will force the fluid in bore 227 through the reduced portion of bore 247 to move ball 249 off its seat for discharge of fluid into the chamber 105'. It is apparent from the foregoing that although the piston pressure is less than that of the fluid pressure in chamber 105', the pumping action will force fluid from the piston bore 228 and groove 222 into the fluid chamber 105'. After such fluid has been discharged, the ball 249 will again seat.

Thus, with each movement of the piston and rise of the piston pressure above a predetermined amount, a pumping action will be provided to eject fluid from the piston bore thereby maintaining a maximum desired differential pressure between opposed sides of the O ring.

With the construction above described, a maximum differential is provided between the pressure on opposed sides of the O rings to ensure dependable sealing action yet without such distortion of the O ring seals which might cause extrusion thereof with resultant breakdown and failure of the seal.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pressure vessel comprising a cylinder having a gas inlet port and a fluid port, a piston slidably mounted in said cylinder intervening between said ports and defining a gas chamber and a fluid chamber, said piston having a pair of spaced annular grooves in its periphery and a third elongated annular groove interposed between said pair of annular grooves, a resilient deformable annular seal in each of said pair of spaced annular grooves, said seals engaging the inner wall of said cylinder, said piston having a chamber therein with a wall at each end exposed in said gas chamber and said fluid chamber respectively, said piston chamber being in communication with said elongated annular groove, the wall exposed in said fluid chamber having a passageway therethrough providing communication between said fluid chamber and the piston chamber and an axial rod slidably mounted in said piston, said rod having one end exposed in said gas chamber and its other end controlling the flow of fluid from said piston chamber through said passageway into said fluid chamber.

2. The combination recited in claim 1 in which the wall of said piston in said gas chamber has an axial bore and said passageway in the wall of said piston in said fluid chamber is axially aligned with said axial bore, said rod being slidably mounted at one end in the bore in said gas chamber wall and exposed to the contents of said gas chamber, resilient means normally urging the other end of said rod in sealing engagement with the passageway in said fluid chamber wall, the diameter of said passageway being less than that of the bore in said gas chamber wall.

3. The combination recited in claim 2 in which said resilient means comprises a coil spring encompassing said rod and compressed between the gas chamber wall and a collar on said rod.

4. The combination recited in claim 1 in which said fluid chamber wall has a bore therethrough radially displaced from said passageway, a valve seat at the outer end of said passageway and a valve member in said bore normally retained against said seat to seal said bore.

5. A pressure vessel comprising a cylinder having a first fluid port and a second fluid port, a piston slidably mounted in said cylinder intervening between said ports and defining a first fluid chamber and a second fluid chamber on opposed sides of said piston respectively and externally of the latter, said piston having a pair of spaced annular grooves in its periphery and a third elongated annular groove interposed between said pair of spaced annular grooves, a resilient deformable annular seal in each of said pair of spaced annular grooves, said seals engaging the inner wall of said cylinder, a passageway between said second fluid chamber and said third elongated annular groove, valve means normally closing said passageway and subjected to the pressure in said first fluid chamber and controlling the flow of fluid through said passageway from said third elongated annular groove into said second fluid chamber.

6. The combination recited in claim 5, in which said valve means is also subjected to the pressure in said second fluid chamber.

7. A pressure vessel comprising a cylinder having a first fluid port and a second fluid port, a piston slidably mounted in said cylinder intervening between said ports and defining a first fluid chamber and a second fluid chamber on opposed sides of said piston respectively and externally of the latter, said piston having a pair of spaced annular grooves in its periphery and a third elongated annular groove interposed between said pair of spaced annular grooves, a resilient deformable annular seal in each of said pair of spaced annular grooves, said seals engaging the inner wall of said cylinder, said piston having a chamber therein with a wall at each end exposed in said first fluid chamber and said second fluid chamber respectively, said piston chamber being in communication with said third elongated annular groove, valve means associated with said piston chamber, said valve means being subjected to the pressure in said first fluid chamber and controlling the flow of fluid from said piston chamber into said second fluid chamber.

References Cited in the file of this patent

UNITED STATES PATENTS

| Re. 24,382 | Greer | Oct. 29, 1957 |
| 2,688,984 | Snyder | Sept. 14, 1954 |
| 2,790,462 | Ashton | Apr. 30, 1957 |